United States Patent [19]

Mahajan

[11] 4,187,974
[45] Feb. 12, 1980

[54] CONDENSATION SOLDERING FACILITY
[75] Inventor: Roop L. Mahajan, Lawrenceville, N.J.
[73] Assignee: Western Electric Company, Inc., New York, N.Y.
[21] Appl. No.: 885,930
[22] Filed: Mar. 13, 1978
[51] Int. Cl.[2] .............................................. B23K 3/00
[52] U.S. Cl. .................................. 228/242; 165/105; 219/439
[58] Field of Search ............... 228/242, 240; 219/430, 219/431, 439, 326; 165/105; 432/210

[56] References Cited
U.S. PATENT DOCUMENTS

| | | | |
|---|---|---|---|
| 3,609,297 | 9/1971 | Christopoulos | 219/439 |
| 3,746,079 | 7/1973 | Arenson | 165/105 X |
| 3,823,307 | 7/1974 | Weiss | 219/439 |
| 3,866,307 | 2/1975 | Pfahl, Jr. et al. | 228/249 |
| 3,904,102 | 9/1975 | Chu et al. | 228/180 R |
| 3,947,240 | 3/1976 | Pfahl, Jr. | 165/105 X |
| 3,967,093 | 6/1976 | Oi | 165/105 X |
| 4,077,467 | 3/1978 | Spigarelli | 165/105 |

Primary Examiner—Charlie T. Moon
Assistant Examiner—K. J. Ramsey
Attorney, Agent, or Firm—D. J. Kirk

[57] ABSTRACT

A first vessel is mounted within and spaced from a second vessel. A primary heat transfer liquid is introduced into the first vessel and a secondary heat transfer liquid introduced into the second vessel. Heating coils immersed in the secondary heat transfer liquid are energized to boil the secondary liquid to form a body of secondary vapor, a portion of which condenses on the outer surface of the first vessel to heat said vessel and boil the primary liquid therein to form a body of primary vapor. An article having previously applied solder thereon is immersed in said body of primary vapor and the solder caused to melt and flow due to the latent heat of vaporization transferred thereto by the primary vapor condensing thereon. Additionally, a tertiary body of vapor is formed above the primary vapor to substantially preclude the loss of the primary vapor to the atmosphere.

9 Claims, 3 Drawing Figures

CONDENSATION SOLDERING FACILITY

BACKGROUND OF THE INVENTION

1. Field of the Invention

This invention relates to methods and apparatus for soldering articles. In particular, articles are immersed in hot vapor to cause the solder to melt and flow to provide a coating and/or bond articles.

2. Description of the Prior Art

It is well known in the prior art to solder coat or bond articles by applying solder to an article in the form of a paste, a preform or the like and immersing the articles into vapor having a temperature at or above the melting point of the solder. Such a process is fully described in U.S. Pat. No. 3,866,307 to Pfahl et al. which issued on Feb. 18, 1975 and is assigned to the instant assignee and Bell Telephone Laboratories, Inc. That patent describes an open-ended vessel having cooling coils about the top portion thereof, a heat transfer liquid within the vessel and heating coils immersed in the liquid. When the heating coils are energized, the heat transfer liquid boils and a body of vapor is formed between the liquid and the cooling coils. Articles to be soldered are immersed in the vapor which condenses thereon, giving up its latent heat of vaporization thereto, causing the solder to flow. The articles are then removed from the vapor to permit the solder to solidify and form a bond between articles.

Such a facility has proven to be eminently satisfactory for soldering a wide variety of articles. However, contaminants such as solder flux or other debris on the articles to be soldered are washed away by the vapor condensate and fall into the heat transfer liquid. Such contaminants come in contact with and befoul the immersed heating coils, resulting in a non-uniform, inefficient heating which can have a deleterious effect on the efficient operation of the facility.

BRIEF SUMMARY OF THE INVENTION

The foregoing problem has been overcome by the instant method and apparatus for soldering an article having previously applied solder thereon. A first vapor, having a temperature greater than the melting temperature of the solder, condenses on the outer surface of a vessel which contains a primary heat transfer liquid. The latent heat of vaporization of the condensing first vapor is transferred to the vessel resulting in the boiling of the primary liquid therein and the generation of a primary vapor. A portion of the primary vapor is then condensed on the article and the solder to heat said article and melt the solder by transferring the latent heat of vaporization thereto. The article with molten solder is then removed from the primary vapor to solidify the solder.

Advantageously, in the instant condensation soldering facility, any contaminants washed from the article to be soldered will remain in the first vessel and will not contact the heating coils. By avoiding such contact, the undesirable befouling of the coils are precluded.

Additionally, the second vessel can be arranged to be a fully enclosed system which precludes loss of any heat transfer vapor to the atmosphere.

Further, by fully enclosing the second vessel it may be pressurized. Such pressurization permits the use of common liquids such as water to be used which can be superheated to attain temperatures above the solder melting temperatures.

Furthermore, the amount of relatively expensive primary heat transfer liquid required in the first vessel is substantially decreased, for there is no longer a requirement to cover the heating coils previously mounted therein. Thus, the amount of the primary heat transfer liquid to be kept in inventory can be decreased.

DETAILED DESCRIPTION OF THE PREFERRED EMBODIMENT

Figure 1:
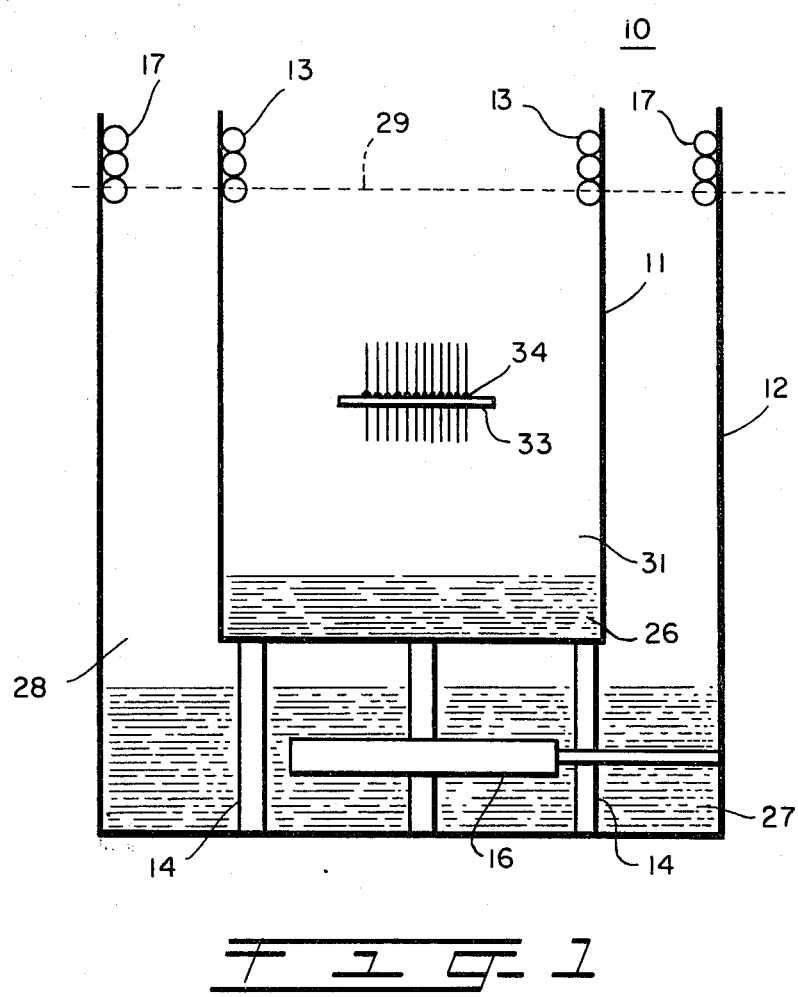
FIG. 1 is a partial sectional view, in elevation, of a condensation soldering facility embodying the instant inventive concepts.

The instant condensation soldering facility is generally designated by the numeral 10 in FIG. 1. The facility 10 is comprised of an inner vessel 11 mounted within an outer vessel 12. The inner vessel 11 has a first set of cooling coils 13 adjacent the upper portion thereof, which coils receive a circulating cooling medium from a source not shown. The inner vessel 11 is supported within, and spaced from, the outer vessel 12 by a plurality of legs 14—14. The outer vessel 12 is provided with a heating coil 16 adjacent to the bottom portion thereof and a second set of cooling coils 17 at the upper portion thereof, which also receive a circulating cooling medium from a source not shown.

To "start-up" the facility 10, a primary heat transfer liquid 26 is introduced into the inner vessel 11. A secondary heat transfer liquid 27 is also introduced into the outer vessel 12 to a level between the top of the coil 16 and the bottom of the inner vessel 11. The heating coil 16 is energized to boil the secondary heat transfer liquid 27 to form a body of secondary vapor 28 in the outer vessel 12 in the volume between the surface of the secondary heat transfer liquid 27 and the second set of cooling coils 17 to approximately the level shown by a first phantom line 29. The secondary vapor 28 will condense on the outer surface of the inner vessel 11 and transfer the latent heat of vaporization thereto to uniformly heat the inner vessel and the primary liquid 26 located therein. The primary liquid 26, having a boiling point less than the temperature of the secondary vapor 28, will boil and a body of primary vapor 31 will form in the volume between the surface of the primary liquid 26 and the cooling coils 13 to approximately the level indicated by the first phantom line 29.

In operation, an article 33 having solder 34 previously applied in the form of a paste, preform or the like is immersed into the body of primary vapor 31 by a conveying apparatus (not shown). The primary vapor 31 will condense on the article 33 and the solder 34 giving up its latent heat of vaporization thereto causing the solder to melt and flow on the article.

The primary vapor 31 which condenses on the solder 34 and the article 33 will drain back to the primary heat transfer liquid 26 and may dissolve and carry away contaminants such as grease, dirt, flux or other debris which may have been on the article. With prior facilities, such contaminants would nucleate on heating coils which were immersed in the primary liquid 26 and befoul the heaters resulting in a non-uniform, inefficient heating. The instant facility 10 substantially precludes such befouling for the heating coils 16 have been removed and placed in the outer vessel 12. Thus, the contaminants remain in the primary liquid 26 and tend to be more uniformly distributed on the walls and bottom of the inner vessel 11. Additionally, the primary liquid 26 is periodically recirculated through a filter (not shown) to remove contaminants therefrom.

The primary heat transfer liquid 26 is characterized by the following properties when the facility is open to the atmosphere:

a. A boiling point at atmospheric pressure at least equal to, and preferably above, the temperature required for the soldering operation.

b. Must produce a saturated vapor which is denser than air at atmospheric pressure.

c. Desirably has a well defined and substantially constant boiling point for better control over the soldering process.

d. Desirably produces a saturated vapor which is non-oxidizing, chemically stable and inert, non-toxic and non-flammable.

The primary heat transfer liquid 26 advantageously is selected from the group of liquids known generically as fluorocarbons. One such liquid is sold by Minnesota Mining and Manufacturing Co. under the tradename "FLUORINERT FC-70."

The secondary heat transfer liquid 27 may be any liquid that has a boiling point above the boiling point of the primary heat transfer liquid 26. In particular, a liquid such as that sold by E. I. DuPont de Nemours and Co. under the tradename "FREON E-5" having a boiling point of 435.6° F. (224.2° C.) at atmospheric pressure, may be used.

Figure 2:
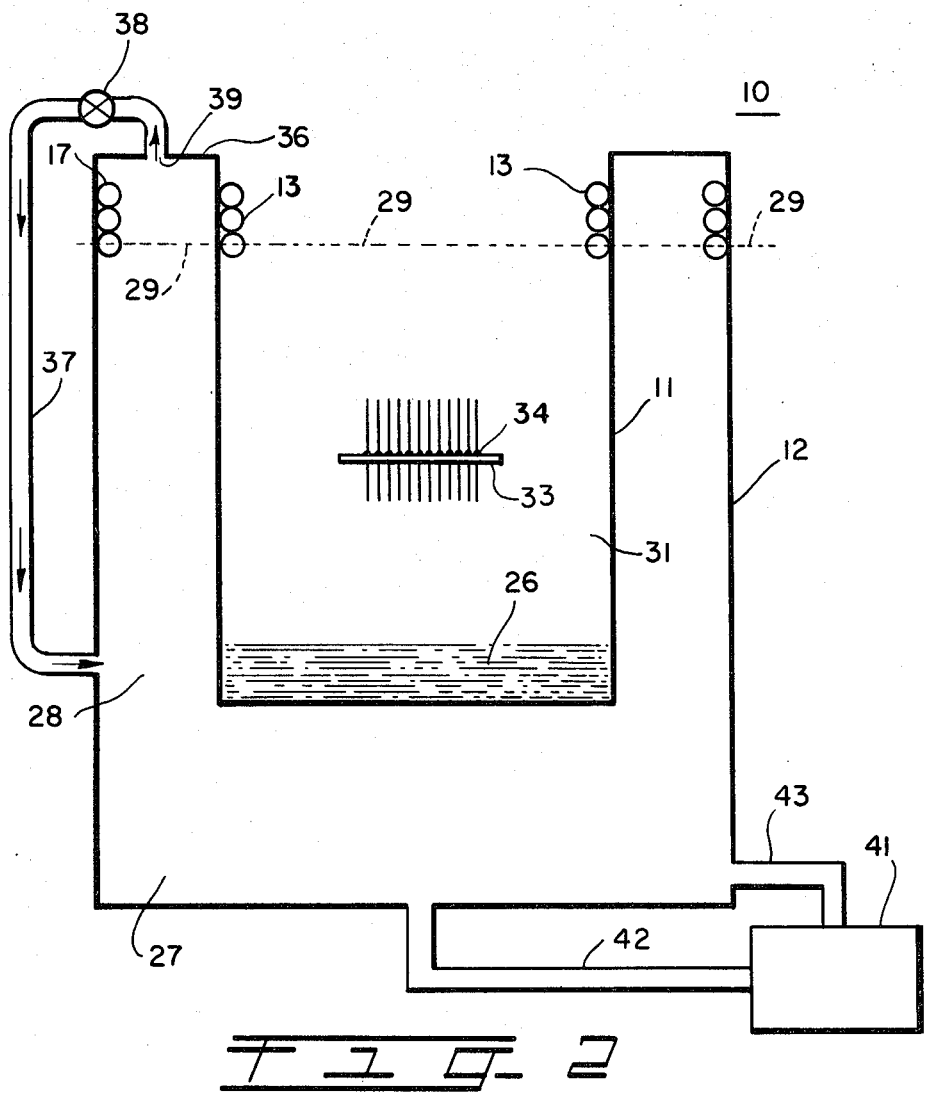
FIG. 2 is a partial sectional view, in elevation, of a further embodiment of the condensation soldering facility.

In a further embodiment of the instant invention set forth in FIG. 2, the condensation soldering facility 10 is modified by providing a sealing plate 36 connecting the top portions of the inner vessel 11 and the outer vessel 12 to support the inner vessel and seal the volume between the two vessels. A by-pass line 37, having a safety valve 38 therein, communicates between an opening 39 in the sealing plate 36 and the lower portion of the outer vessel 11. The heating coil 16 (shown in FIG. 1) has been removed and a secondary vapor source 41 communicates with the inside of the outer vessel 12 via suction and discharge lines 42 and 43, respectively.

Accordingly, by forming a seal between the inner vessel 11 and the outer vessel 12 the enclosed volume may then be pressurized above or below atmospheric pressure. For example, water may be superheated in source 41 to boil at a temperature of about 420° F. under a pressure of 308.78 pounds per square inch and injected directly into the outer vessel 12 from the source.

Excessive pressure build up in the outer vessel 12 may be controlled by opening the safety valve 38 or by decreasing the temperature of the coolant passing through the coils 17. As previously indicated, the secondary vapor zone 28 is maintained at the level 29. However, some vapor may flow above that line but would pass into the bypass line 37, condense, and flow back into the outer vessel 12 as secondary heat transfer liquid 27. All secondary vapor condensate will run to the bottom of the outer vessel 12 and into the suction line 42 to be regenerated as secondary vapor by the source 41. Such a closed system precludes any loss of the secondary heat transfer vapor 28 to the atmosphere.

A further aspect of the instant invention is the incorporation therein of a vapor blanket which is interposed between the body of primary vapor 31 and the atmosphere to substantially reduce the loss of the primary vapor to the atmosphere. U.S. Pat. No. 3,904,102 to Chu et al. which issued on Sept. 9, 1975, and is assigned to the instant assignee, describes a method and apparatus for reducing the loss of vapor to the atmosphere by forming a vapor blanket above the primary vapor. The facility 10 is modified, as shown in FIG. 3, to have a portion 51 extending upward from the first set of cooling coils 13 and a third set of cooling coils 52 are mounted proximate the top of the extended portion.

Figure 3:
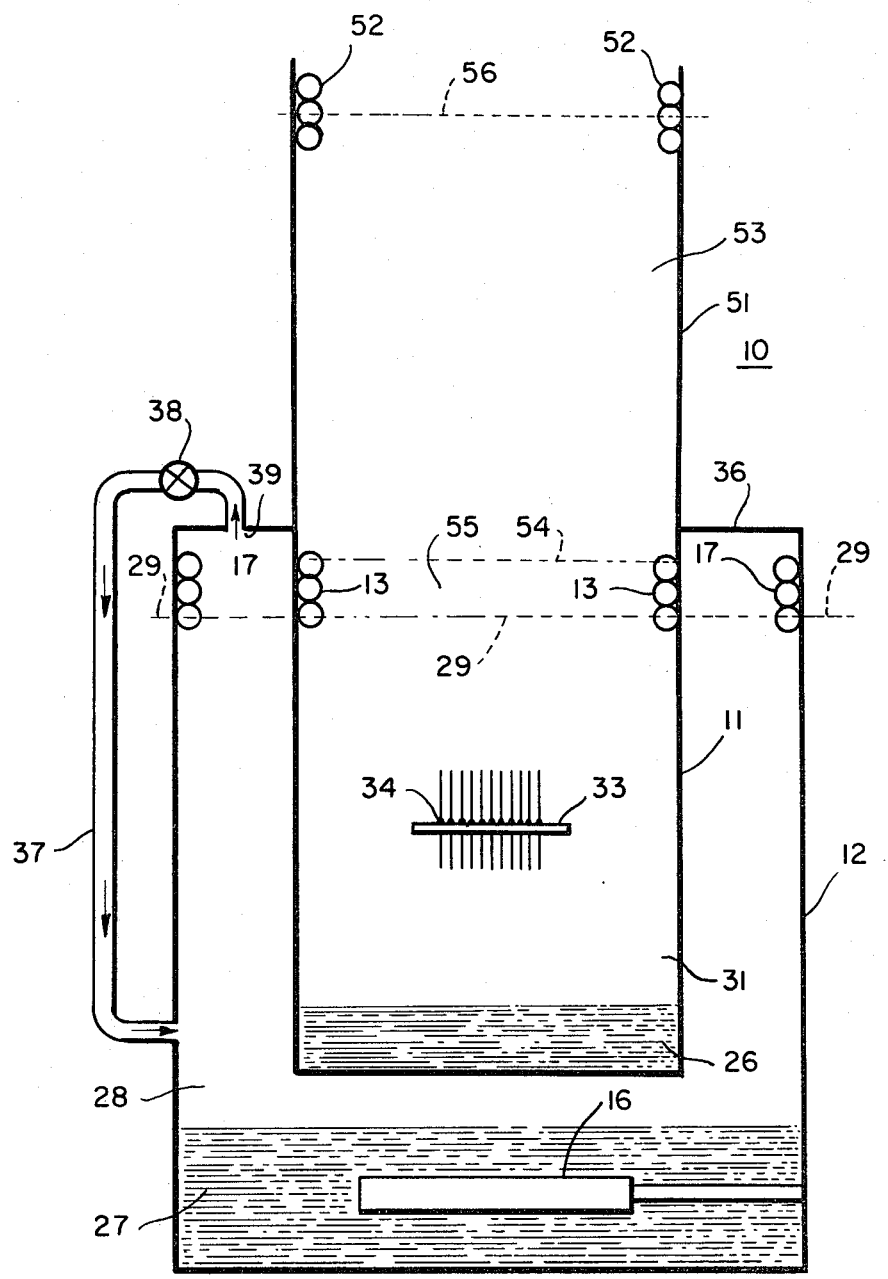
FIG. 3 is a partial sectional view, in elevation, of a condensation soldering facility incorporating a vapor blanket.

The "start-up" of the exemplary embodiment of FIG. 3 is accomplished by introducing a mixture of two heat transfer liquids into the inner vessel 11. One of the two liquids is the primary heat transfer liquid as hereinbefore described while the other is a tertiary liquid which is characterized by the following properties:

a. A lower boiling point at atmospheric pressure than the primary liquid.

b. Must produce a vapor which, for the embodiments disclosed herein is, at atmospheric pressure, less dense than saturated vapor from the primary liquid at this pressure and which is denser than air at this pressure and at the same temperature.

c. Desirably does not form an azeotrope with the primary liquid.

d. Desirably produces a saturated vapor which does not support a high equilibrium moisture content.

e. Desirably produces a saturated vapor which is non-oxidizing, chemically stable, non-toxic and non-flammable.

A suitable tertiary heat transfer liquid adapted for use in the manner hereinbefore described with FLUORINERT FC-70 as the primary heat transfer liquid advantageously is selected from the group of liquids known generically as halogenated hydrocarbons such as trichloro-trifluoro-ethane. Such a liquid is sold by E. I. DuPont de Nemours and Co. under the tradename "FREON TF" and has the following significant properties:

Boiling point at atmospheric pressure—117.6° F. (47.6° C.);
Electrical resistivity—greater than $2 \times 10^{15}$ ohm-cm.;
Dielectric constant—2.41;
Latent heat of vaporization—63.12 BTU/pound;
Density of saturated vapor at boiling point and atmospheric pressure—0.4611 pound/ft.$^3$;
Substantially chemical stability, very low toxicity, non-flammability.

Accordingly, the facility 10 shown in FIG. 3 may employ FLUOROINERT FC-70 as the primary heat transfer liquid, FREON E-5 as the secondary heat transfer liquid and FREON TF as the tertiary heat transfer liquid.

When the mixture of primary and tertiary liquids has been brought to a boil, the lower-boiling, non-azeotrope forming, tertiary liquid will boil off first, and the saturated vapor therefrom, hereinafter termed tertiary vapor 53, will fill the vessel 11 up to some level, depending upon the quantity of tertiary liquid in the liquid mixture. After the tertiary liquid has boiled off, the remaining primary liquid 26 will be further heated until its boiling point is reached, whereupon the primary liquid will boil and produce a primary vapor 31. The body of primary vapor 31 being denser than the tertiary vapor 53, as the primary vapor 31 is formed and rises within vessel 10, the lighter tertiary vapor will be pushed upward in the vessel 11 by the primary vapor.

In effect, the tertiary vapor 53 will be stably stratified over and float on the primary vapor 31 and provide a vapor blanket thereover. The proportions of primary and tertiary liquids in the mixture thereof will be selected and determined by the geometry of the vessel 11, the locations of the primary and tertiary sets of cooling coils 13 and 52, respectively, in the vessel 11, and the desired thickness of the layer of tertiary vapor 53 over the primary vapor 31.

Specifically, the proportions of primary and tertiary liquid in the mixture thereof are chosen so that, at equilibrium, after start-up as hereinabove described, there will exist in vessel 11 a body of essentially primary vapor 31, the top of which will be approximately at the level indicated diagrammatically by the first phantom line 29 extending through the primary set of cooling coils 13. There will also exist a body of a mixture of primary and tertiary vapor extending from the level indicated diagrammatically by the first phantom line 29 up to a level indicated diagrammatically by a second phantom line 54. The body of tertiary vapor 53 extends from the level indicated diagrammatically by the phantom line 54 up to a level indicated diagrammatically by a third phantom line 56 extending through the tertiary set of cooling coils 52.

Accordingly, there is no interface between the body of primary vapor 31 and the atmosphere. Rather, the body of tertiary vapor 53 acts as a barrier or lid over the body of primary vapor 31, and thereby reduces or substantially eliminates any tendency of the primary vapor to escape to the atmosphere. It will be appreciated, then, that if the primary liquid 26 is relatively quite expensive compared to the tertiary liquid, the provision of the body of tertiary vapor over the body of primary vapor, acting to reduce or substantially eliminate losses to the atmosphere of primary vapor, will considerably reduce the cost of operation of a facility embodying condensible fluids to melt solder on articles. There will, of course, be some loss of tertiary vapor to the atmosphere across the tertiary vapor-air interface. Where, as hereinbefore stated, the tertiary liquid is less expensive than the primary liquid, this loss will not constitute as serious an economic charge against the soldering operation, and may under some circumstances, be quite insignificant.

In operation, the condensation soldering facility 10 shown in FIG. 3, heating coils 16 are energized to boil the secondary liquid 27 which forms the body of secondary vapor 28 which condenses on the inner vessel 11, transferring the latent heat of vaporization of the secondary vapor thereto. The primary and tertiary liquids in the inner vessel boil forming the bodies of primary vapor 31 and tertiary vapor 53 as hereinbefore described. The article 33 is lowered into the vessel 10 through the body of tertiary vapor 53 and into the body of primary vapor 31. Hot saturated primary vapor 31 will condense on the article 33 giving up its latent heat of vaporization to the article and the previously applied solder 34 until the temperature of the article and solder reaches or closely approaches the temperature of the primary vapor. The article 33 and the solder 34 thereon will rapidly approach the temperature of the primary vapor 31 because the heat transfer coefficients for condensation processes are among the highest known for any mode of heat transfer. When the temperature becomes sufficiently high, the solder 34 will melt or reflow to effect the soldering operation on the article 33. Once the solder 34 has completely melted, the article 33 is removed from the facility 10 to permit cooling of the article and solidification of the solder.

I claim:

1. A method of soldering an article having previously applied solder thereon, comprising the steps of:
    condensing a portion of a first vapor on a first vessel, having a primary heat transfer liquid therein, to transfer the latent heat of vaporization of the first vapor to the vessel to boil the heat transfer liquid therein and generate a primary vapor therefrom;
    generating the first vapor, having a temperature greater than the melting temperature of the solder, in a second vessel, having at least a portion of the first vessel mounted therein, wherein the volume between the first and second vessels is sealed from the atmosphere;
    controlling the pressure within the sealed volume by adjusting the temperature of a cooling means, mounted therein;
    condensing a portion of the primary vapor on the article and the solder to heat said article and solder to the melting temperature of solder by transferring the latent heat of vaporization thereto to melt the solder on the article; and
    removing the article from the primary vapor to solidify the solder.

2. The soldering method as set forth in claim 1, wherein the first vapor is generated by:
    introducing a secondary heat transfer liquid into the second vessel having a heating means therein; and
    energizing the heating means to boil the secondary heat transfer liquid to generate the first body of vapor.

3. The soldering method as set forth in claim 2, wherein:
    at least the lower half of the first vessel is mounted within the second vessel.

4. The soldering method as set forth in claim 2, which is further characterized by:
    interposing a body of tertiary vapor between the primary vapor in the first vessel and the atmosphere.

5. The soldering method as set forth in claim 4, which is characterized by:
    generating the first vapor outside the second vessel; and
    introducing the first vapor into the sealed volume between the first and second vessels.

6. The soldering method as set forth in claim 1, which is further characterized by:
    interposing a body of tertiary vapor between the primary vapor in the first vessel and the atmosphere.

7. A condensation soldering facility for soldering articles, comprising:
    a first vessel to receive a primary heat transfer liquid having a boiling point at least equal to the solder melting temperature;
    a first means for condensing vapor, mounted within the first vessel and at a predetermined elevation above the bottom of said vessel;
    a second vessel, mounted proximate the first vessel and having a common wall defining a volume therebetween that is sealed from the atmosphere, to receive a secondary heat transfer liquid having a boiling point greater than the solder melting temperature;

a second means for condensing vapor, mounted within the second vessel and at a predetermined elevation above the bottom of said vessel to control the temperature of said vapor; and means for heating the secondary liquid to generate a secondary vapor therefrom.

8. The condensation soldering facility as set forth in claim 7, wherein:
   at least a portion of the first vessel is mounted within the second vessel.

9. The condensation soldering facility as set forth in claim 8 which further comprises:
   a third means for condensing vapor, mounted within the first vessel and at a predetermined elevation above the first condensing means.

* * * * *